(12) United States Patent
Paulik

(10) Patent No.: US 8,033,366 B2
(45) Date of Patent: Oct. 11, 2011

(54) CYCLE BRAKE COOLING ARTICLE

(76) Inventor: Istvan Paulik, Fort Lauderdale, FL (US)

( * ) Notice: Subject to any disclaimer, the term of this patent is extended or adjusted under 35 U.S.C. 154(b) by 776 days.

(21) Appl. No.: 12/070,123

(22) Filed: Feb. 15, 2008

(65) Prior Publication Data
US 2008/0135360 A1    Jun. 12, 2008

Related U.S. Application Data

(63) Continuation-in-part of application No. 11/074,096, filed on Mar. 7, 2005, now Pat. No. 7,337,884.

(51) Int. Cl.
*B61H 5/00*    (2006.01)
(52) U.S. Cl. .................................. 188/264 A
(58) Field of Classification Search ............... 188/264 A, 188/264 AA
See application file for complete search history.

(56) References Cited

U.S. PATENT DOCUMENTS

| | | | |
|---|---|---|---|
| 2,579,603 A | 5/1952 | Tack | |
| D281,912 S | 12/1985 | Rudd | |
| 4,793,293 A | 12/1988 | Minami | |
| 5,544,726 A | 8/1996 | Topouzian et al. | |
| 6,315,091 B1 | 11/2001 | Nilsen et al. | |
| 6,578,678 B2 | 6/2003 | Lee | |
| 7,198,139 B2 * | 4/2007 | Wilson et al. | 188/264 AA |

* cited by examiner

*Primary Examiner* — Bradley King
(74) *Attorney, Agent, or Firm* — Melvin K. Silverman; Yi Li (57) ABSTRACT

Cycle brake cooling articles are secured at and offset from braking elements of a wheel of a cycle, each article having a Venturi-like rigid surface, including a central portion that defines a void space, which in combination with said braking element, defines an air deflection and concentration path focused upon the brake element of the cycle wheel to effect a cooling of the element and escape of heat thru the void space. A distal portion of each rigid surface is securable to a front fork of the cycle. The Venturi-like surface may include a proximal intake section and a distal focusing section.

7 Claims, 9 Drawing Sheets

CYCLE BRAKE COOLING ARTICLE

CROSS-REFERENCE TO RELATED APPLICATIONS

This is a continuation-in-part of application Ser. No. 11/074,096 filed Mar. 7, 2005, and the same is incorporated herein by reference in its entirety.

BACKGROUND OF THE INVENTION

1. Area of Invention

The present invention relates to motorcycles.

2. Prior Art

Brakes work by using friction to slow a rotating disc or drum, a rotor thereof, turning kinetic energy into thermal energy. Metal-backed fiber pads or shoes are pressed onto the rotor by a hydraulic or mechanical article to create friction. During this process, the pads or shoes are subject to wear and overheating. One effect of overheating of brake components is warping or coning of the brake rotor. Another result of overheating is a reduction in frictional properties at the brake interface above a predetermined temperature. This may result in longer stopping distances, especially after repetitive heavy stopping. Preventing the frictional surfaces from exceeding the predetermined temperature will provide greater durability and life for the brake rotor and pads.

The terms cycle and motorcycle as used herein denote motorbikes, mopeds, cycles, scooters and the like.

The prior art includes means for brake rotor ventilation and cooling for motor vehicles as shown in U.S. Pat. No. 5,544,726 to Topouzian et al. and U.S. Pat. No. 6,578,678 to Lee. The prior art also includes a motorcycle carburetor cooling air duct as shown in U.S. Pat. No. 4,793,293 to Minami. U.S. Design Pat. No. 281,912 to Rudd discloses an ornamental design for a motorcycle cover light and air scoop. U.S. Pat. No. 2,579,603 to Tack, entitled Brake Cooling Baffle and U.S. Pat. No. 6,315,091 (2001) to Nilsen, entitled Brake Cooling System.

It would be desirable to provide a brake cooling article, for a motorcycle having improved properties of heat transfer out of a corresponding brake rotor that is cost-effective and easy to install as an aftermarket product. The present invention addresses this long felt need in the art.

SUMMARY OF THE INVENTION

Cycle brake cooling articles are secured at and offset from braking elements of a wheel of a cycle, each article having a Venturi-like rigid surface, including a central portion that defines a void space, which in combination with said braking element, defines an air deflection and concentration path focused upon the brake element of the cycle wheel to effect a cooling of the element and escape of heat thru the void space. A distal portion of each rigid surface is securable to a front fork of the cycle. The Venturi-like surface may include a proximal intake section and a distal focusing section. The cycle brake cooling article also includes a wheel securing portion dependent from a distal edge of said air focusing surface, said portion comprising a bar securable to said wheel of said cycle, and said focusing surface having opposing lateral runners depending substantially normally from said bar of said front wheel securing portion, said runners straddling said void space.

Said rigid surface includes a line of dependency comprising means for optional adjustment of said intake surface relative to said air focusing surface. A second line of dependency comprises means for optional adjustment of said air focusing surface relative to said front fork securing tabs. A third line of dependency comprises means for optional adjustment of opposing upper and lower portions of the intake surface to selectably vary a vertical dimension of the intake of said primary surface to thereby control volume, path, and rate of air flow into the air focusing surface. The opposing upper and lower portions of the intake surface define a length of about 1 to about 3 centimeters.

The tabs include an engagement site which exhibits a width of about 0.6 to about 1.2 centimeters.

It is an object of the invention to provide an improved motorcycle brake cooling means.

It is another object is to improve the longevity of the brake pads and braking elements.

It is a further object to provide an article of the above type that can be retro-fit to a cycle as an after-market product.

The above and yet other objects and advantages of the present invention will become apparent from the hereinafter set forth Brief Description of the Drawings, Detailed Description of the Invention, and Claims appended herewith.

DETAILED DESCRIPTION OF THE INVENTION

Figure 1:
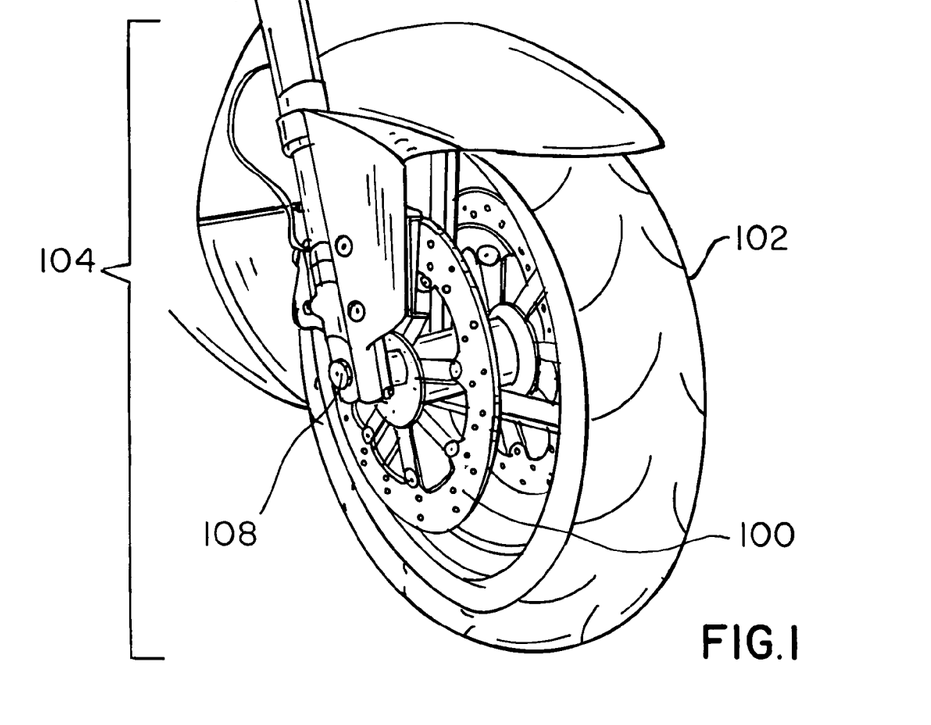
FIG. 1 is a perspective view of a front or proximal portion of a motorcycle showing the general geometry and position of the inventive cycle brake cooling article.
Figure 2:
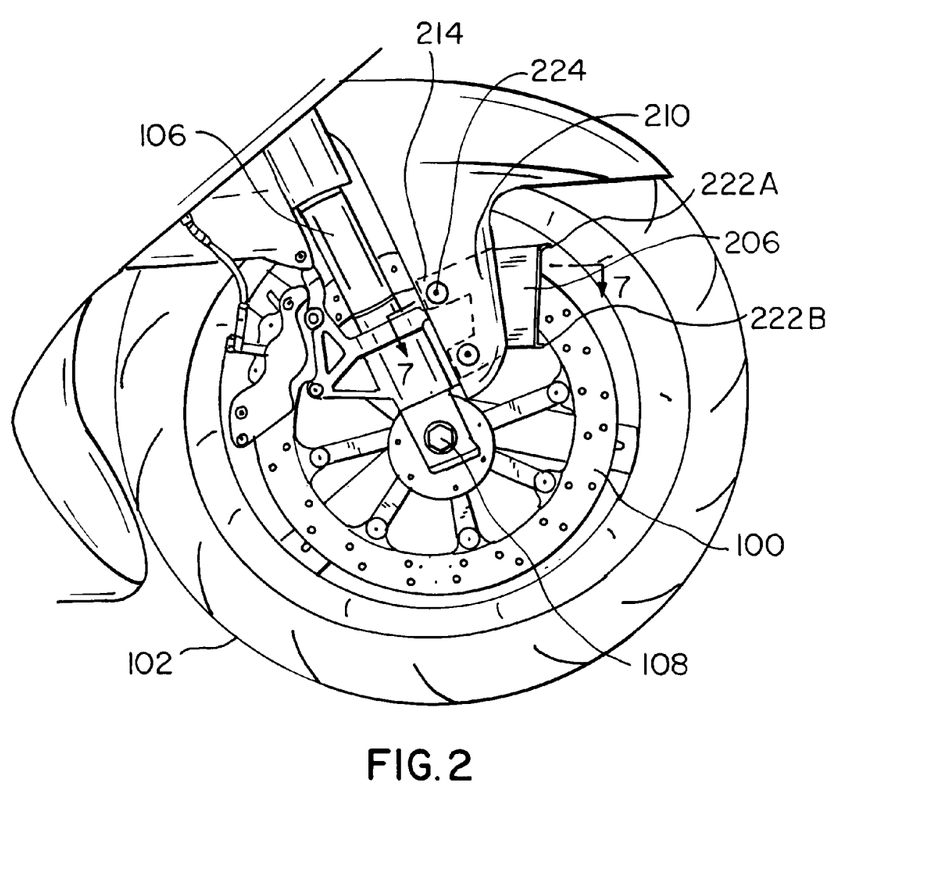
FIG. 2 is a perspective side view of the cycle brake cooling element illustrating its placement near to the brake rotor or horizontal surfaces of the cycle wheel.
Figure 3:
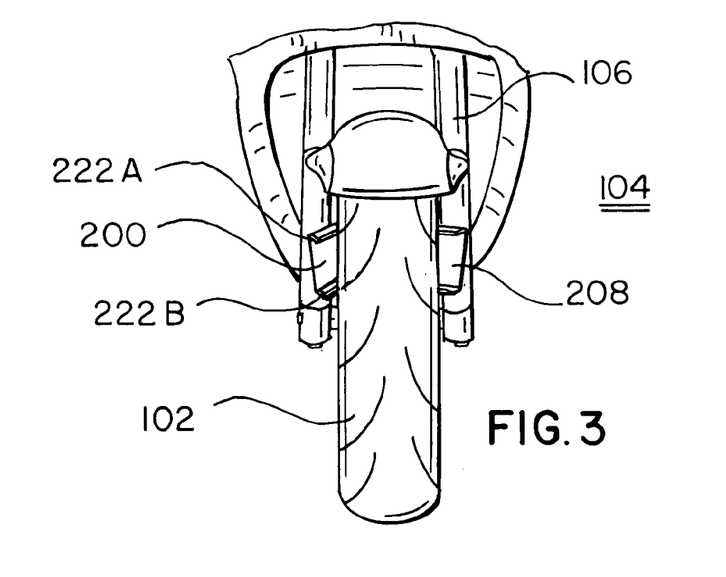
FIG. 3 is a perspective front view of the front portion of the motorcycle with cooling elements placed on opposing sides of the front wheel axle.

With reference to FIGS. 1 and 2 there is shown, in perspective view, cycle brake cooling article 200 secured at and offset from a circumferential braking element 100 at opposing sides of each wheel 102 of a cycle 104, the horizontal position of which relative to front wheel 102 of a cycle 104 is also shown. In FIG. 2 also may be seen the general geometry of the inventive cycle brake cooling article 200, attached to each side of the front fork 106. The brake cooling article may be attached to one side or both sides of the front fork 106. The brake cooling article may also be attached through a fender and the front fork. In FIG. 3 fork 106 is shown mounted to both sides of axle 108 of the front wheel 102 of the cycle 104.

Figure 5:
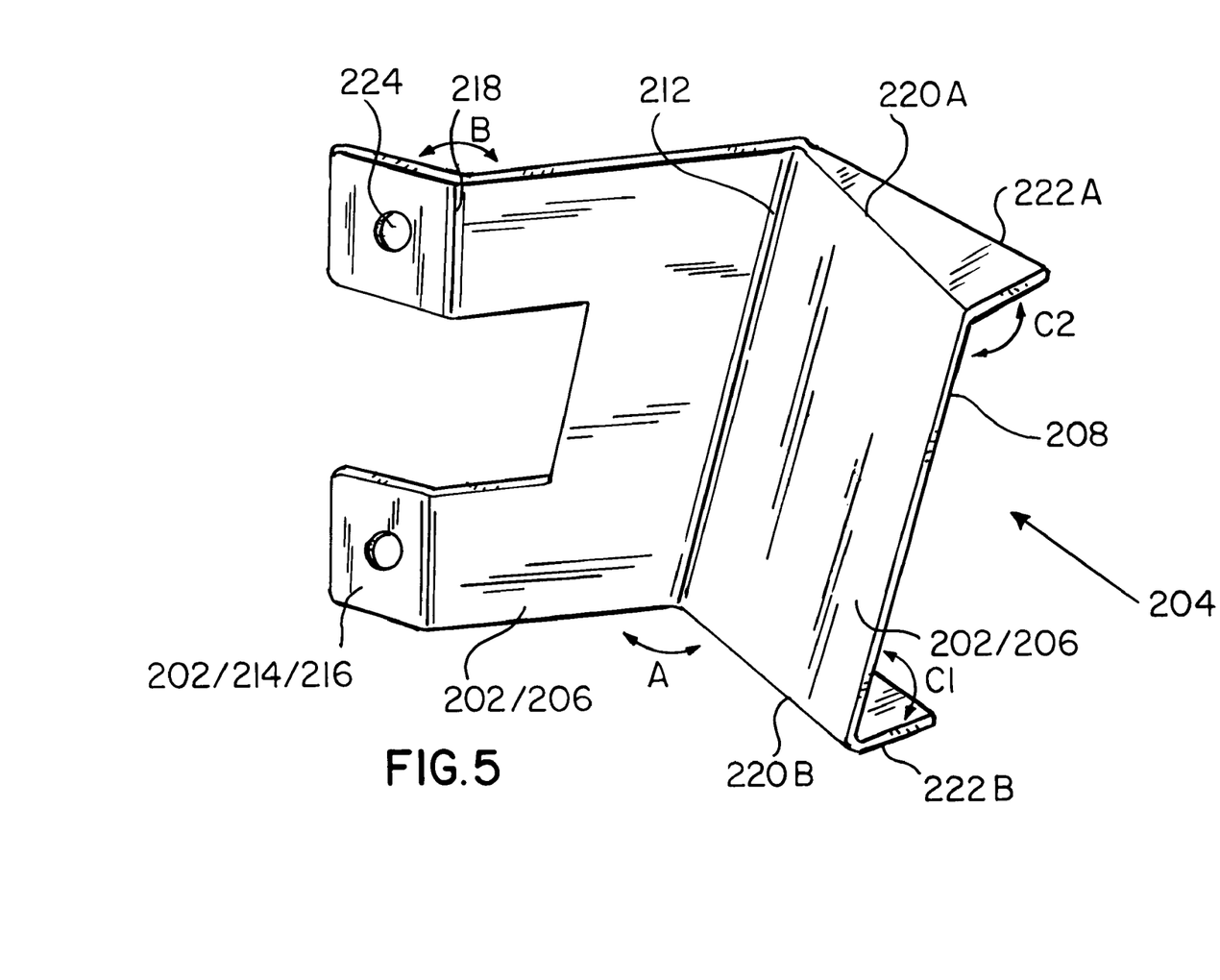
FIG. 5 is a perspective view of a single brake cooling article.
Figure 6:
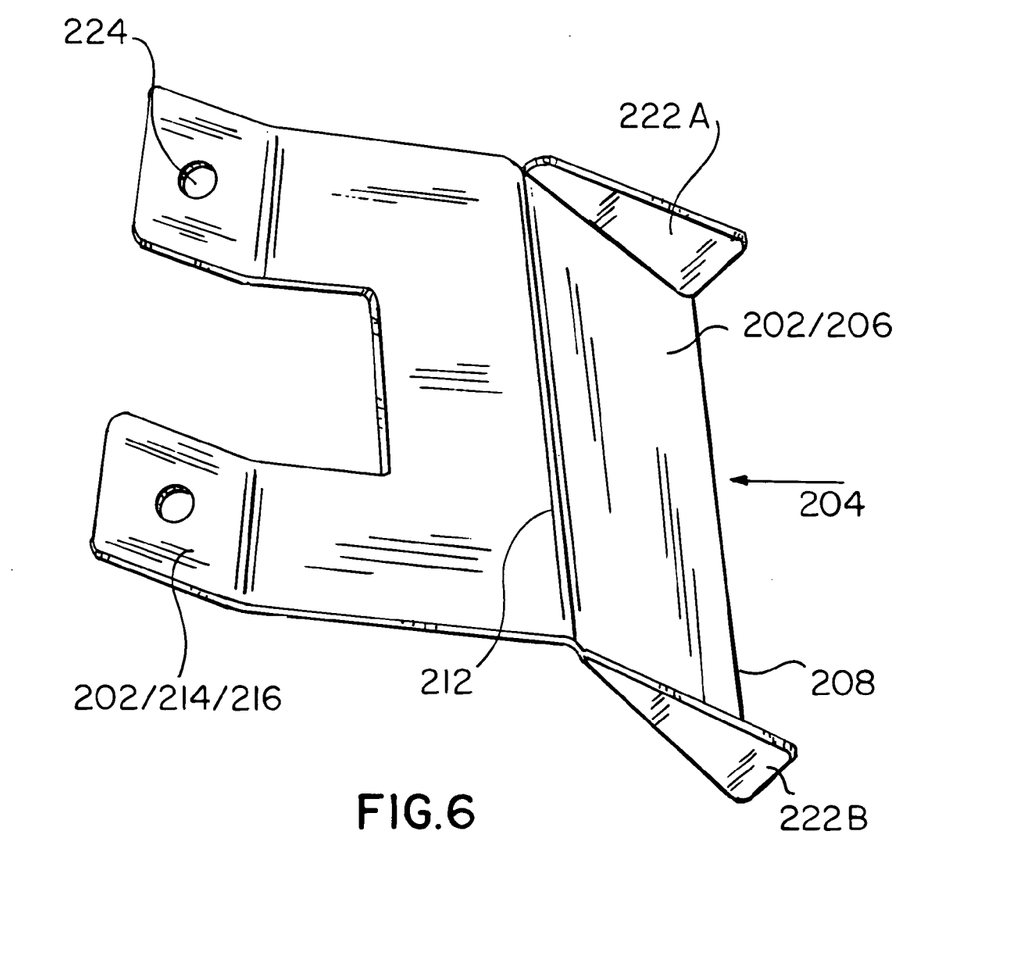
FIG. 6 is a perspective reverse view of the cycle brake cooling article.

In FIGS. 5 and 6 the cycle brake cooling article 200 alone may be seen to include a rigid surface 202, in combination with the braking means 100, defining an air deflection and concentration path therein 204. Said path is focused to the brake element 100 of said cycle wheel 102. By forcing the airflow into a Venturi-like reduced volume, so that the air path 204 is concentrated and accelerated, thus enhancing its cooling capacity when it comes into contact with a solid.

Figure 7:
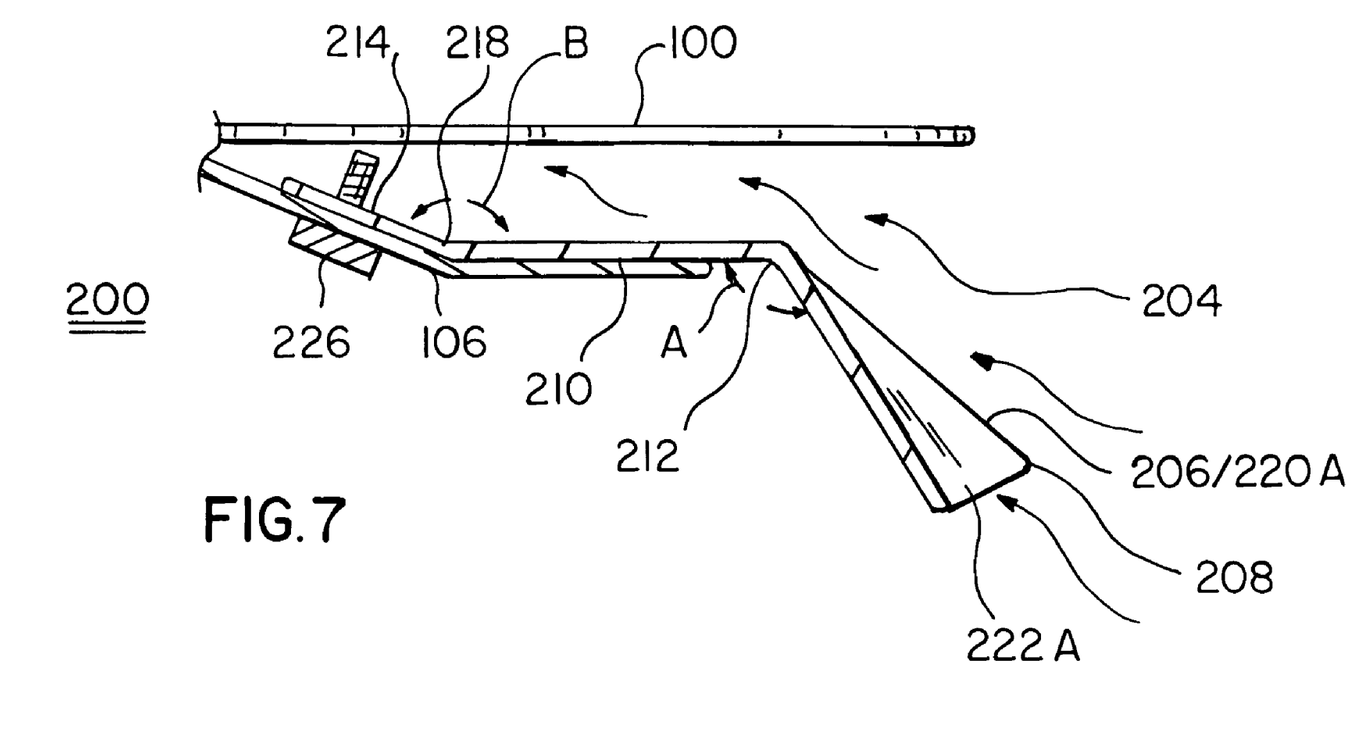
FIG. 7 is an enlarged, horizontal cross sectional view of a cooling article attached to a front fork and showing the direction of air flow between the brake disc and the inventive article.
Figure 8:
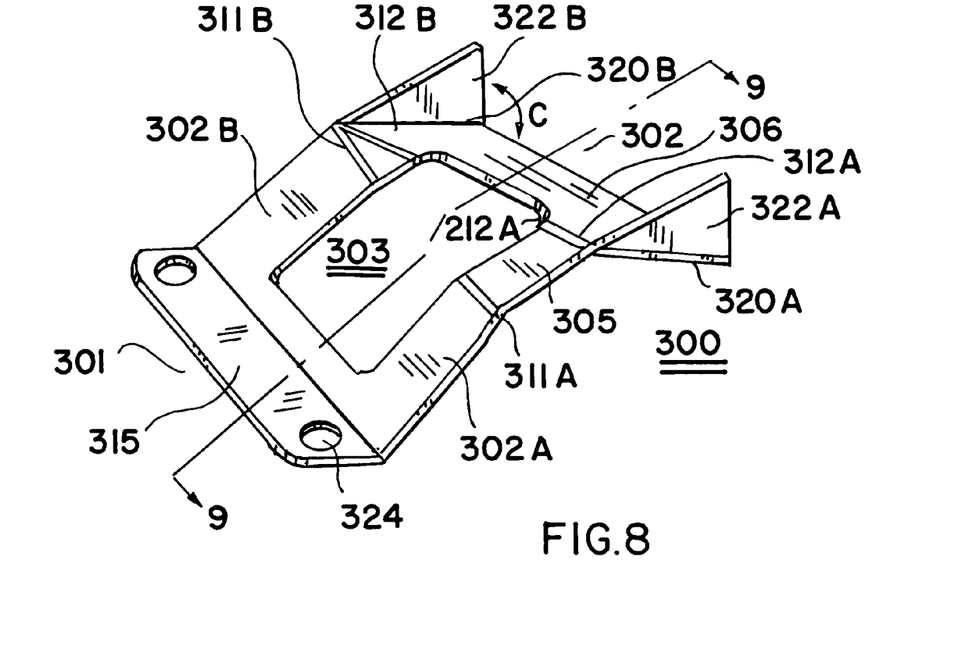
FIG. 8 is a perspective view a third embodiment of the present invention.
Figure 9:
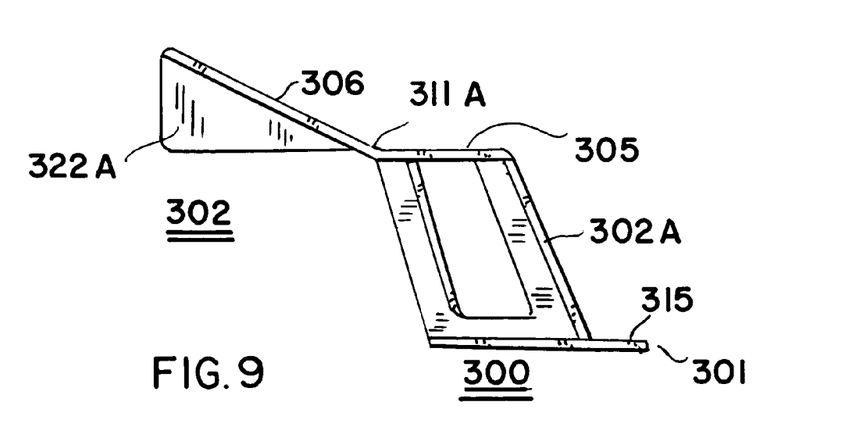
FIG. 9 is a center axial cross-sectional view taken along Line 9-9 of FIG. 8.
Figure 10:
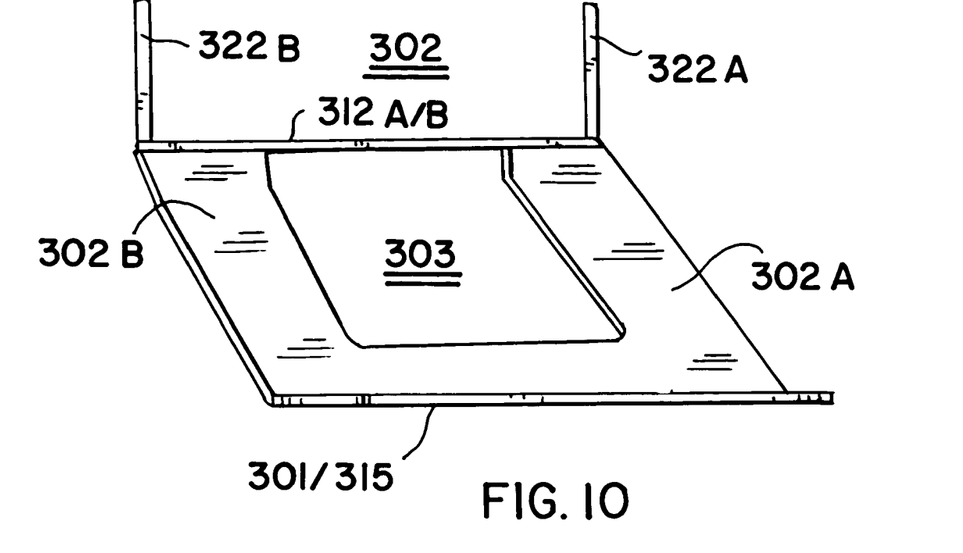
FIG. 10 is an elevational view from the distal direction of the embodiment of FIG. 8.

As shown in FIGS. 5-7 the rigid surface 202 includes an intake and deflection surface 206 surface 32 which defines the air intake from a proximal edge 208 of surface 206. Also, the rigid surface 202 includes an air focusing surface 210 of reduced horizontal and volumetric cross-section relative to the intake surface 206, and is dependent at a vertical edge 212 of the intake surface 206.

Figure 4:
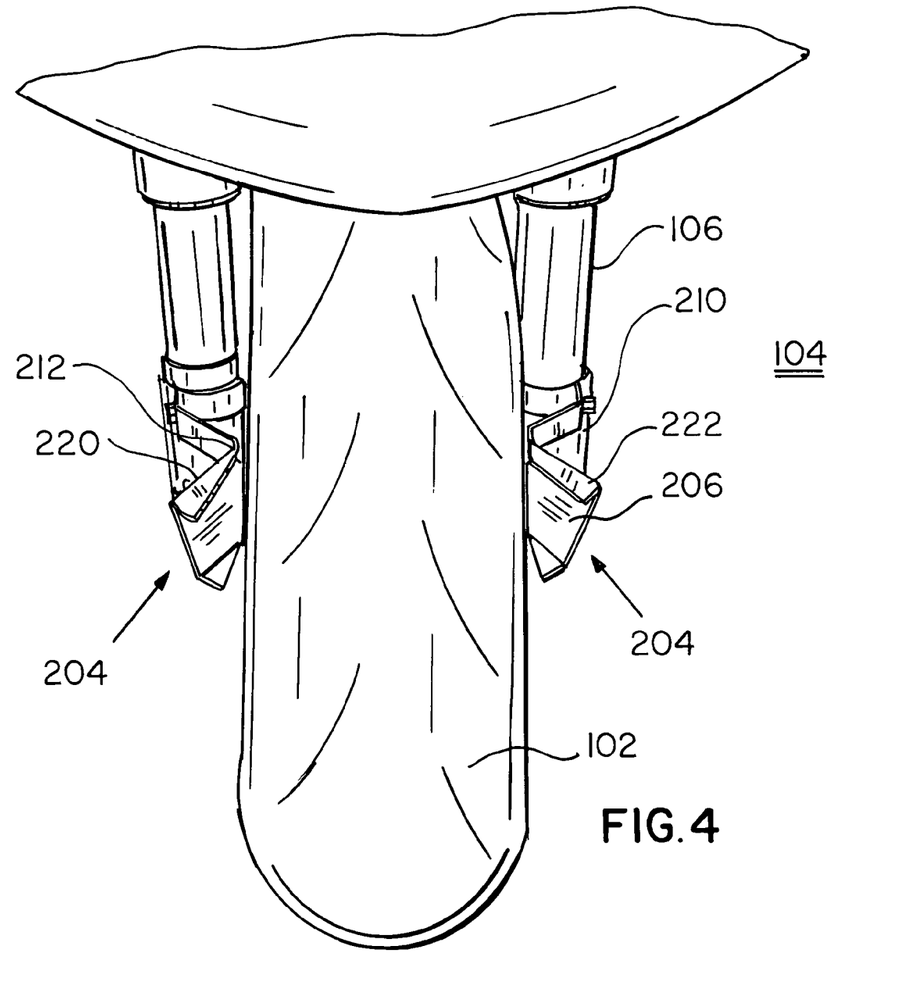
FIG. 4 is an enlarged view of the cooling articles showing the direction of air flow.

In FIG. 4 may be seen a front fork securing portion 214 dependent from a distal vertical edge 216 of the air focusing surface 210. This allows for further focus of air relative to the braking elements 100. The rigid surface 202 also includes said distal portion 216 of said air focusing surface 210, which defines tabs 214 for securing the article 200 to said front fork 106 of said cycle 104.

Rigid surface 202 includes said edge 212 which is a first line of dependency which defines means for optional adjustment of the intake surface 206 relative to the air focusing surface 210. (See FIGS. 5 and 6). Said first line of dependency 212 allows for control of the volume of air deflected into the air deflection and concentration path 204. If the intake surface 206 is bent too far away from the air focusing surface 210 and away from the brake element 100, the air intake will decrease resulting in a decreased cooling capacity. An optimum total included Angle A between surfaces 206 and 212 is typically about 120 degrees. (See FIG. 7).

A second line of dependency 218 defines means for optional adjustment of Angle B of the tabs 214 relative to the air focusing surface 210. (See FIGS. 5 and 7). Again, the adjustment of the upper and lower portions 222A and 222B relative to the air focusing surface 210 can create an increase or decrease in the cooling capacity. Angle B is typically in the range of 90 to about 130.

FIGS. 5 and 6 show opposing third lines of dependency 220A and 220B which define means for optional adjustment of opposing upper and lower portions 222 of the intake surface 206 to selectably vary the volume of the intake or Angles C1 and C2 of said intake surface 206 to thereby control volume, speed and path of air flow 204 into the air focusing surface 210. The adjustment of the opposing upper and lower portions 222 of the intake surface 206 allow air to be focused more towards the air deflection or concentration path 204 or away from the path causing more or less air intake relation to said Angles C1 and C2 which will have a typical angel of 45 to about 135 degrees. (See FIG. 4) Angles C1 and C2 are typically the same, but can be modified to fit a specific type of cycle. The upper and lower portions 222 of the intake surface 206 define a longitudinal length of about 1 to about 3 centimeters.

In FIGS. 5 and 6 it is shown that the tabs 214 include engagement sites 224. The engagement sites exhibits a width of about 0.6 to about 1.2 centimeters. A locking nut 226 or other attachment means is used to secure the tabs 214 to the front fork. Alternatively, the tabs may be secured by a locking nut through the front fork and fender. Each tab may be the same length as the other or they may be different lengths, depending on the design and structure of the cycle.

With reference to FIG. 8 to 12, there is shown a further embodiment of the present invention which, like the embodiments of FIGS. 1-7, relates to a cycle brake cooling article, securable at and offset from a brake element of a wheel of the cycle. Said third embodiment, that is, cooling article 300 includes a distal end 301 and a proximal side 302. Included within the proximal side is an intake and deflection surface 306 which defines a proximal air intake. Intake and deflection surface 306 integrally includes a transition portion 305 integrally connected thereto along lines of dependency 312A and 312B. See angle A2 in FIG. 11.

As may be further noted in the figures, ear-like tabs 322A and 322B depend upwardly from an intake end at proximal side 302 of deflection surface 306 and are joined thereto along lines of dependency 320A and 320B at an angle C. A second portion of intake end deflection surface 306 is said transition portion 305, separated from the intake of deflection surface 306 by optionally bendable lines 312A and 312B. As may be noted in FIGS. 8, 10 and 12, transition portion 305 extends to an air focusing surface 302A and 302B, integrally depending from transition portion 305 along lines 311A and 311B. The planar relation therebetween is defined by angle A1. See FIG. 11. Said air focusing surfaces are, more particularly, defined as opposing lateral runners 302A and 302B which also define an area of void space 303. As may be further noted in FIGS. 8, 10 and 12, a proximal portion of void space 303 exists within said transition portion 305 which may, optionally, extend beyond line of dependency 312A/312B.

It is, thereby, to be appreciated that said intake and deflection surface 306 (inclusive of transition portion 305) and said air focusing surface 302A/302B (including runners or strips 302A/B) in combination, produce a Venturi-like effect due to the reduction of volumetric dimension, above described with respect to FIG. 7. That is, the principles of the embodiment of FIGS. 8-12 are the same as that of the embodiments of FIGS. 1 through 7, the primary difference of structure being that of void space 303, said transition portion 305, and the use of bar 315 having therein apertures 324 to secure the article 300 to the brake element of the wheel of a cycle. Stated otherwise, the primary difference between the embodiments of FIGS. 8-12 and those of FIGS. 1-7 is the provision of void space 303 by which heat may be transferred away from the brake element of a wheel of the cycle concurrently with the focusing of a channel of external air 204 to the brake element, in the manner above described in the first and second embodiments of the invention and illustrated in FIG. 7.

The additional central portion 305 to the air intake and deflection surface 306 also serves to provide more flexibility with regard to the direction of focus of the channel of external air 204 that is focused at the brake element. In other words, in the present embodiment, it has been discovered that intake surface 206 (shown in FIG. 5) can be defined by runners 302A/302B while including void space 303 as part of the design and functional concept of the invention.

Figure 11:
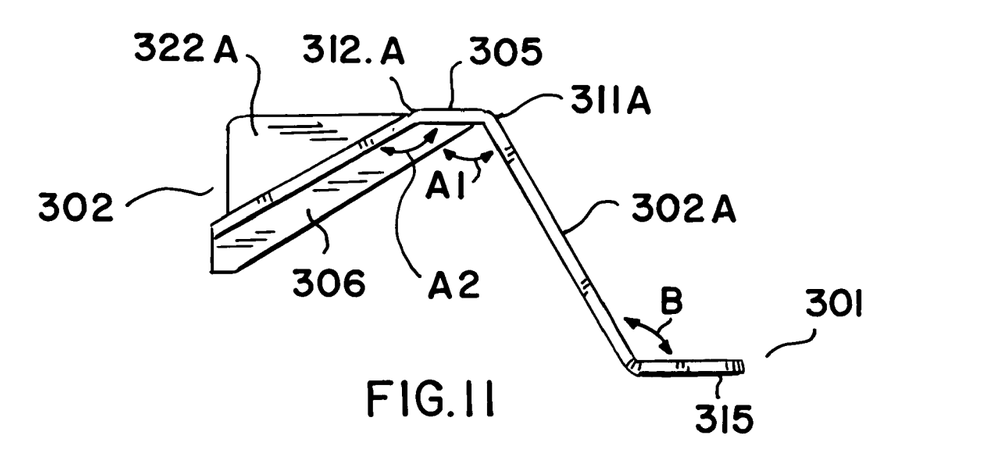
FIG. 11 is a rear side plan view of the embodiment of FIG. 8.

With reference to FIG. 11, angle B defines the planer relation between bar 215 and runners 302A/302B. Therein, angle A1 equals angle B.

Figure 12:
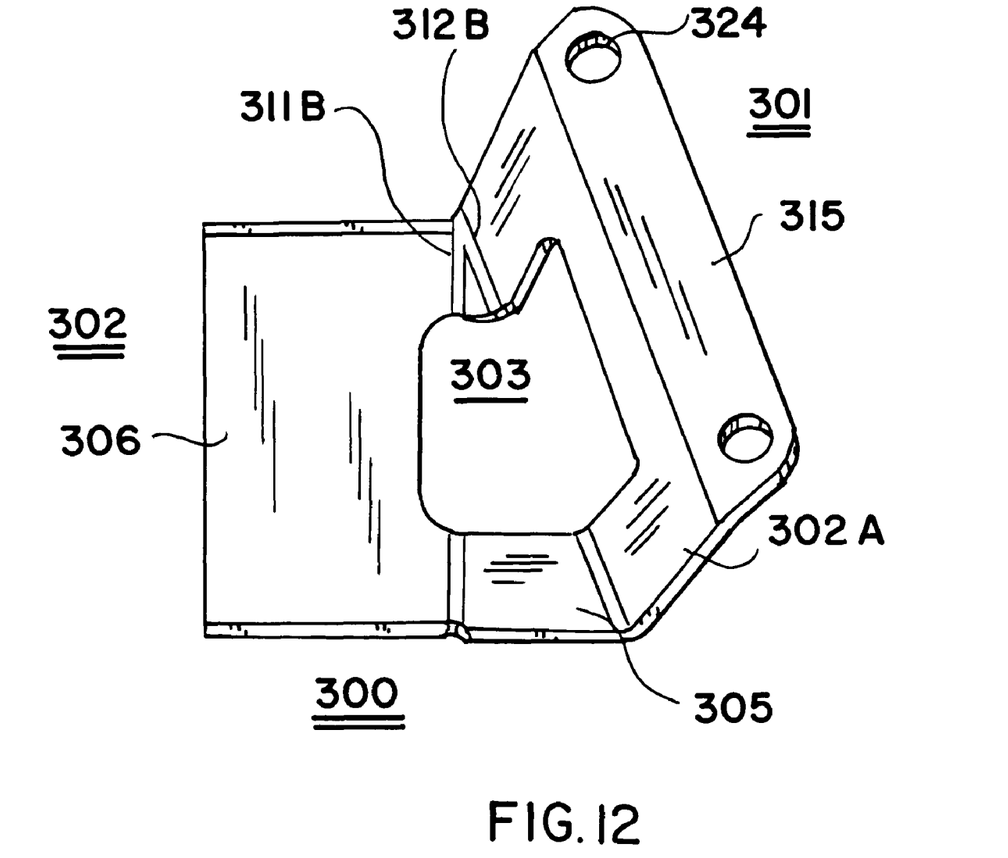
FIG. 12 is a top perspective view of the embodiment of FIG. 8.

As may be noted in FIG. 12, lines of dependency 311B and 312B join at one side of the inventive article 300 in an acute angle in a range of about 25 to about 45 degrees, as generally dictated by the style or model of the motorcycle Said lines of dependency 312A/311B are alternatively referred to herein as optionally bendable first lines of dependency between the intake surface and air focus surface. Said lines of dependency 320A/320B between said ear-like tabs 322A/322B respectively are alternatively referred to herein as optionally bendable second lines of dependency.

Said dependency lines 311A/311B are alternatively referred to herein as opposing optionally bendable third lines of dependency between said lateral runners 302A/302B and said central portion 305. The effect of adjustment of the parts of the inventive article on either side of said third line of dependency is (1) to effect control of volume, path and speed of air flow into the air focusing surface defined by runners 302A/302B and (2) to control the nature of heat transfer out through void space 303.

The brake cooling article is typically made of a lightweight material for cycles traveling at high speeds. The lightweight materials include aluminum, fiber glass, carbon fiber, and other lightweight alternatives.

While there has been shown and described the preferred embodiment of the instant invention it is to be appreciated that the invention may be embodied otherwise than is herein specifically shown and described and that, within said embodiment, certain changes may be made in the form without departing from the underlying ideas or principles of this invention as set forth in the Claims appended herewith.

What is claimed is:

1. A cycle brake cooling article, securable at an offset from a rotating circumferential brake element of a cycle, the article comprising:
   (a) a rigid surface defining an air deflection and concentration path having a proximal air intake end thereof and at a distal end thereof a cycle frame securing portion securable to front forks of a frame of a cycle, said rigid surface having a central portion including a part of an elongate void space;
   (b) an air focusirig surface at a distal side of said void space, and having opposing runner elements depending substantially normally from a cycle frame securing portion, said cycle frame securing protion depending from a distal edge of said air focusing surface; and
   (c) a transition surface between said intake end and said air focusing surface, said transition portion substantially defining a triangle including, at an apex thereof, an acute angle between respective lines of dependency between said transition portion and said respective air intake and air focusing surfaces, said transition surface including a portion of said void space,
   whereby said article focuses a channel of air from said air focusing surface at said brake element of said cycle while also effecting heat transfer therefrom through said void space.

2. The cycle brake cooling article as recited in claim 1, further including opposing third lines of dependency between said lateral runners of said transition surface to define means to selectably vary, a runner positioned at a proximal end of said intake end relative to said transition surface to control volume, path and speed of air flow into said air-focusing surface and control heat transfer through said void space.

3. The cycle brake cooling article as recited in claim 1 in which said cycle frame securing portion includes front frame fork engagement sites.

4. The cycle brake cooling article as recited in claim 1, in which said acute angle is in a range of between about 25 and about 45 degrees.

5. The cycle brake cooling article as recited in claim 1, further including:
   optionally bendable lines of dependency between (i) said air intake surface and said transition surface and (ii) said transition surface and said air focusing surface, said bendable lines of dependency effecting adjustment of the planes of said surfaces relative to each other and thereby the airflows associated therewith.

6. The cycle brake cooling article as recited in claim 1, in which lines of dependency of ear-like tabs depending from said intake surface comprise optionally bendable lines of dependency between said tabs and said air intake end of said rigid surface.

7. The cycle brake cooling article recited in claim 6 in which said ear-like tabs of said intake surface each define a length in the direction of air flow of about 1 to about 3 centimeters.

* * * * *